United States Patent
Ergan et al.

(10) Patent No.: US 8,773,442 B2
(45) Date of Patent: *Jul. 8, 2014

(54) ALIGNING ANIMATION STATE UPDATE AND FRAME COMPOSITION

(75) Inventors: Cenk Ergan, Bellevue, WA (US); Benjamin C. Constable, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/543,129

(22) Filed: Jul. 6, 2012

(65) Prior Publication Data

US 2012/0274645 A1 Nov. 1, 2012

Related U.S. Application Data

(63) Continuation of application No. 12/881,470, filed on Sep. 14, 2010, now Pat. No. 8,243,079.

(30) Foreign Application Priority Data

Aug. 26, 2010 (CA) .................................... 2711874

(51) Int. Cl.
*G06T 13/00* (2011.01)

(52) U.S. Cl.
USPC .......................................... 345/473; 345/475

(58) Field of Classification Search
None
See application file for complete search history.

(56) References Cited

U.S. PATENT DOCUMENTS

| 5,621,431 | A | * | 4/1997 | Harper et al. ................. 345/473 |
| 5,771,167 | A | | 6/1998 | Gomi et al. |
| 5,983,190 | A | | 11/1999 | Trower, II et al. |
| 6,351,267 | B1 | | 2/2002 | Gever et al. |
| 6,734,873 | B1 | | 5/2004 | Herf et al. |
| 6,967,688 | B1 | | 11/2005 | Morrish |
| 7,443,401 | B2 | * | 10/2008 | Blanco et al. ................. 345/473 |
| 8,243,079 | B2 | | 8/2012 | Ergan et al. |
| 2002/0145611 | A1 | * | 10/2002 | Dye et al. ....................... 345/543 |
| 2003/0110297 | A1 | * | 6/2003 | Tabatabai et al. ............. 709/246 |
| 2004/0066363 | A1 | * | 4/2004 | Yamano et al. ................. 345/98 |
| 2004/0075677 | A1 | | 4/2004 | Loyall et al. |
| 2005/0033999 | A1 | * | 2/2005 | Nishikawa .................... 713/300 |
| 2006/0101293 | A1 | * | 5/2006 | Chandley et al. ............. 713/300 |
| 2006/0214934 | A1 | * | 9/2006 | Foote ............................ 345/473 |
| 2007/0057952 | A1 | | 3/2007 | Swedberg et al. |

(Continued)

FOREIGN PATENT DOCUMENTS

WO WO-03036471 5/2003

OTHER PUBLICATIONS

"Foreign Notice of Allowance", Canadian Application No. 2711874, (Mar. 3, 2011), 1 page.

(Continued)

*Primary Examiner* — Daniel Hajnik
(74) *Attorney, Agent, or Firm* — Andrew Sanders; Micky Minhas (57) ABSTRACT

An event, such as a vertical blank interrupt or signal, received from a display adapter in a system is identified. Activation of a timer-driven animation routine that updates a state of an animation and activation of a paint controller module that identifies updates to the state of the animation and composes a frame that includes the updates to the state of the animation are aligned, both being activated based on the identified event in the system.

20 Claims, 5 Drawing Sheets

(56) References Cited

U.S. PATENT DOCUMENTS

| | | |
|---|---|---|
| 2007/0136730 A1 | 6/2007 | Wilt et al. |
| 2007/0248333 A1 | 10/2007 | McCrossan et al. |
| 2008/0120626 A1 | 5/2008 | Graffagnino et al. |
| 2008/0246757 A1 | 10/2008 | Ito |
| 2009/0079743 A1 | 3/2009 | Pearson et al. |
| 2010/0180228 A1 | 7/2010 | Ben-Harrush et al. |
| 2010/0238181 A1 | 9/2010 | Forney et al. |
| 2011/0109624 A1 | 5/2011 | Greenberg et al. |
| 2012/0050297 A1 | 3/2012 | Ergan et al. |

OTHER PUBLICATIONS

"Foreign Office Action", Canadian Application No. 2711874, (Nov. 19, 2010), 4 pages.

"Non-Final Office Action", U.S. Appl. No. 12/881,470, (Aug. 16, 2011), 14 pages.

"Notice of Allowance", U.S. Appl. No. 12/881,470, (Apr. 17, 2012), 18 pages.

"The OxygenTM GVX210 Graphics Accelerator User's Guide", *3D Labs, Inc.*, Available at: <http://www.3dlabs.com/legacy/manuals/62-000002-001A.pdf>,(2000), 49 pages.

* cited by examiner

ALIGNING ANIMATION STATE UPDATE AND FRAME COMPOSITION

RELATED APPLICATIONS

This application is a continuation of U.S. patent application Ser. No. 12/881,470, filed Sep. 14, 2010, entitled "Aligning Animation State Update And Frame Composition" to Cenk Ergan, et al., which is hereby incorporated by reference herein. U.S. patent application Ser. No. 12/881,470 claims priority to Canadian Application for Patent Serial No. 2711874, filed Aug. 26, 2010.

BACKGROUND

Web pages can include sets of instructions, such as scripts, that are executed to display an animation on a computing device. Although such instructions allow web pages to easily display animations, they are not without their problems. One such problem is that the execution of the instructions generating these animations can result in animations that have a jittery or jumping appearance. Displaying such animations results in an undesirable user experience because the animations, rather than having a smooth appearance, have a jittery or jumping appearance.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, an event in a system is identified, such as a vertical blank (vblank) signal or interrupt received from a display adapter. The activation of a timer-driven animation routine that updates a state of an animation and activation of a paint controller module that identifies updates to the state of the animation and composes a frame that includes the updates to the state of the animation are aligned, both being activated based on the identified event in the system.

BRIEF DESCRIPTION OF THE DRAWINGS

The same numbers are used throughout the drawings to reference like features.

DETAILED DESCRIPTION

Aligning animation state update and frame composition is discussed herein. A timer-driven animation, such as an animation implemented in a Web page script, includes one or more routines that update a state of the animation. A paint controller module identifies changes made by the one or more routines and composes frames for display that include these changes. A paint beat module activates the one or more routines, resulting in the one or more routines updating the state of the animation. The paint beat module also activates the paint controller module, resulting in the paint controller module composing a frame for display that includes the updated state of the animation. The composing of the frame by the paint controller module and the updating of the state of the animation by the one or more routines are thus aligned with one another by the paint beat module. The paint beat module can activate the one or more routines and the paint controller module in response to different signals or system events, such as a vertical blank (vblank) signal or interrupt received from a display adapter in the system.

Figure 1:
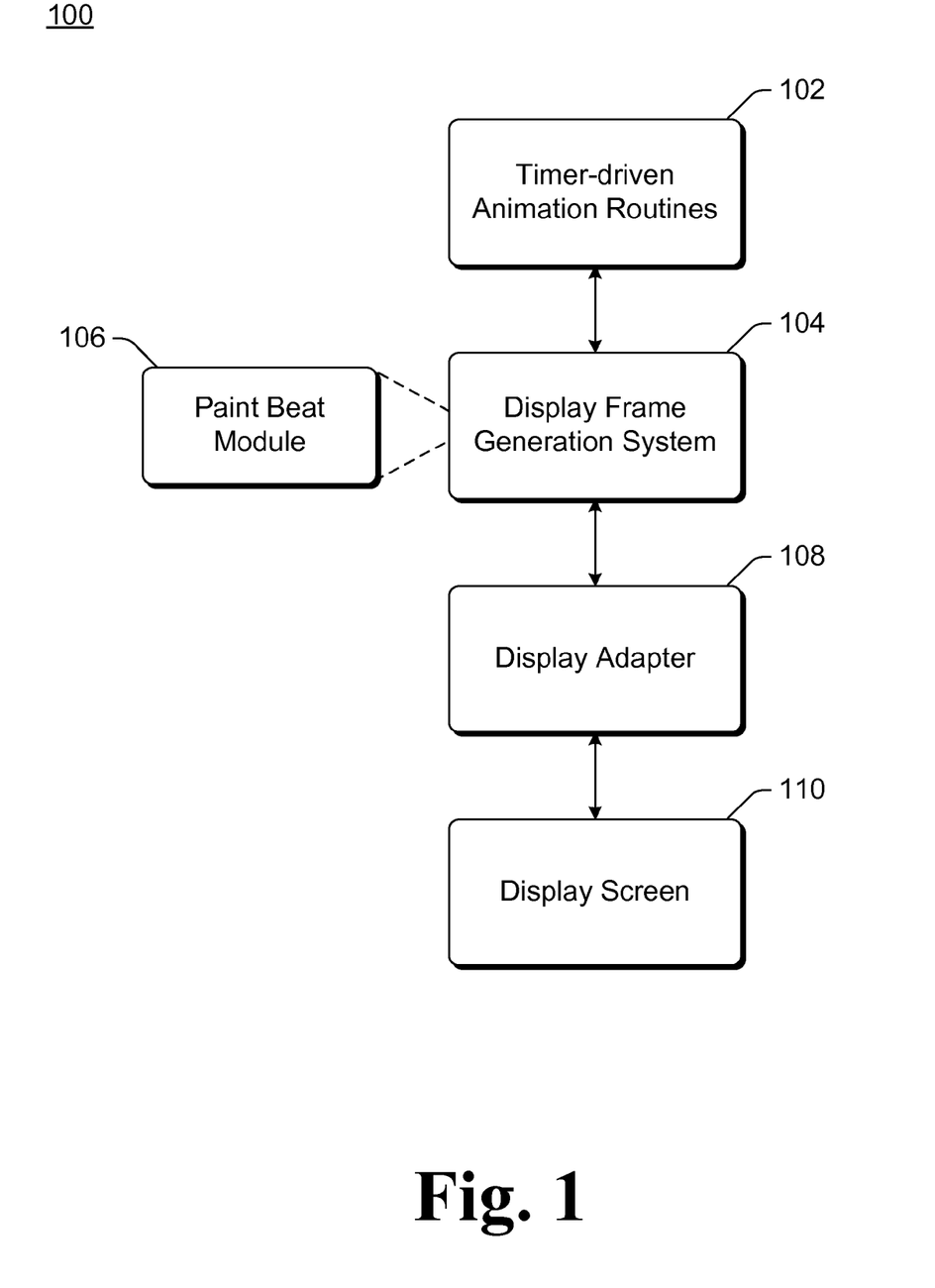
FIG. 1 illustrates an example system implementing the aligning animation state update and frame composition in accordance with one or more embodiments.

FIG. 1 illustrates an example system 100 implementing the aligning animation state update and frame composition in accordance with one or more embodiments. System 100 includes one or more timer-driven animation routines 102, a display frame generation system 104 including a paint beat module 106, a display adapter 108, and a display screen 110. System 100 can be implemented in a variety of different types of devices, such as a desktop computer, a laptop computer, a notepad or tablet computer, a mobile station, an entertainment appliance, a set-top box communicatively coupled to a display device, a television, a cellular or other wireless phone, a game console, an automotive computer, and so forth. Timer-driven animation routines 102, display frame generation system 104, display adapter 108, and display screen 110 can be implemented in the same or alternatively different devices. For example, timer-driven animation routines 102, display frame generation system 104, and display adapter 108 can be implemented in one device (e.g., a laptop computer), and display screen 110 can be implemented as a separate device (e.g., a projector or liquid crystal display (LCD) screen).

In system 100, one or more timer-driven animation routines 102 each generate an update in state for an animation to be displayed on display screen 110. This update of state is a change in a display of one or more regions of a frame. Timer-driven animation routines 102 are awakened or otherwise activated at particular intervals, and display frame generation system 104 manages the wakening or other activation of timer-driven animation routines 102 at the appropriate intervals. Paint beat module 106 determines the appropriate intervals, and can be based on a vertical blank (vblank) interrupt or signal as discussed in more detail below.

At the appropriate intervals, as determined by paint beat module 106, display frame generation system 104 awakens or otherwise activates timer-driven animation routines 102 that update the state for the animation. Display frame generation system 104 also composes a new frame of video data for display, and this new frame includes the updates made by timer-driven animation routines 102. Display frame generation system 104 provides the new frame to display adapter 108, which encodes the frame into a format that is expected by display screen 110. Display adapter 108 sends the frame to display screen 110, which displays the frame. Display screen 110 can be any device capable of displaying video data, such as a projector, an LCD screen, a plasma screen, and so forth. Numerous frames are typically generated and sent to display screen 110 each second, such as 30 frames per second (fps), 60 fps, 120 fps, and so forth.

Figure 2:
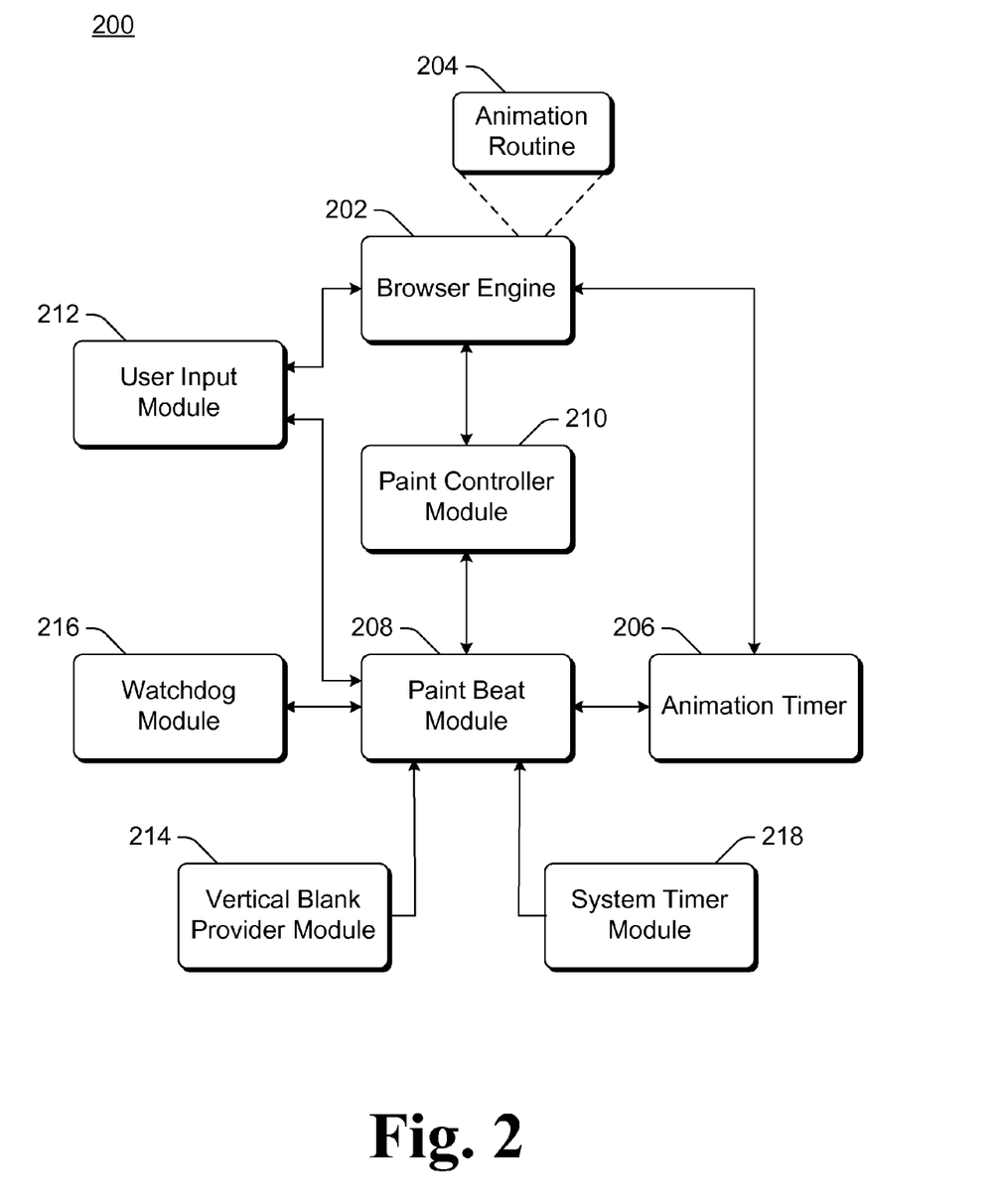
FIG. 2 illustrates another example system implementing the aligning animation state update and frame composition in accordance with one or more embodiments.

FIG. 2 illustrates another example system 200 implementing the aligning animation state update and frame composition in accordance with one or more embodiments. System 200 illustrates an example display frame generation system 104 in additional detail in accordance with one or more embodiments.

System 200 includes a browser engine 202 in which an animation routine 204 is run. Animation routine 204 is, for example, a timer-driven animation routine 102 of FIG. 1. Although a single animation routine 204 is illustrated in system 200, multiple animation routines 204 can be run in browser engine 202. Animation routine 204 is a set of instructions or other code, and oftentimes is included in a script of a Web page being displayed by browser engine 202. Such a script can be executed by, for example, a Javascript™ engine or other ECMAScript engine of browser engine 202. Alternatively, animation routine 204 can be initiated or setup in other manners, such as using Cascading Style Sheets (CSS) or other style sheet languages.

Animation routine 204 has an associated animation timer 206. Animation routine 204 notifies browser engine 202 of how regularly animation routine 204 desires to be awakened or otherwise activated. Each time animation routine 204 is awakened or otherwise activated, animation routine 204 updates the state of the animation, which refers to updating the display of one or more regions of the frame being displayed. By updating the state of the animation, as multiple frames are displayed the desired animation is displayed. The updating of the state can include various different actions based on the desired animation, such as changes in color, changes in locations of lines, changes in shapes, changes in brightness or intensity, and so forth.

Browser engine 202 generates an animation timer 206 that is triggered or activated by paint beat module 208. Paint beat module 208 determines when to trigger or activate animation timer 206 based on a particular event or signal, as discussed in more detail below. Animation timer 206, when triggered or otherwise activated, activates animation routine 204 to update the state of the animation. Thus, triggering or otherwise activating animation timer 206 can also be referred to as triggering or otherwise activating animation routine 204. Additionally, although illustrated as two separate components in system 200, animation routine 204 and animation timer 206 can be the same component or module. For example, animation timer 206 can include the instructions that update the state of the animation (animation routine 204).

Additionally, after triggering or activating animation timer 206, paint beat module 208 activates paint controller module 210. In response to being activated, paint controller module 210 operates in a conventional manner to paint or compose a new frame of video data for display. This new frame of video data includes the changes to any regions that were updated by animation routine 204.

In one or more embodiments, paint controller module 210 is notified by animation routine 204 of any regions of the frame that are changed as a result of the updating performed by animation routine 204. Paint controller module 210 is also notified of the changes to these regions by animation routine 204 (e.g., animation routine 204 providing video data indicated the results of the changes to the regions). These regions that are changed are also referred to as invalidated regions because the video data in those regions that was used for the previous frame has been changed and is no longer valid. These regions can be individual pixels for display, or alternatively groups of pixels (e.g., blocks of pixels, the pixels within a particular window, etc.). Paint controller module 210 maintains a record of the previous frame that paint controller module 210 composed as well as the invalidated regions of the frame. For the new frame, paint controller module 210 generates new video data for the invalidated regions (based on the changes made by animation routine 204) and uses the data from the previous frame for regions that are not invalidated. Paint controller module 210 provides the new frame to a display adapter (e.g., display adapter 108 of FIG. 1) so that the new frame can be displayed on the display screen.

Paint controller module 210 can also be notified of invalidated regions from user input module 212 and/or browser engine 202. User input module 212 can receive user inputs in a variety of different manners, such as via a touchpad or touchscreen, via a keypad or keyboard, via a cursor control device, via a microphone, via physical feedback inputs (e.g., tapping a portion of computing device 102, or other detected motions such as shaking or rotating of computing device 102), and so forth. These user inputs can be provided to browser engine 202 (e.g., in situations where the user is interacting with browser engine 202), and also to paint beat module 208 (or alternatively paint controller module 210). Some user inputs can result in a change to the video data for the frame, such as user input of an alphanumeric character, user movement of a cursor, touching of a portion of a touchpad or touchscreen, and so forth. Other changes to the video data for the frame can also be animations resulting from user inputs and/or browser engine 202, such as scrolling of a Web page, panning or zooming of a Web page, a different Web page being displayed due to selection of a tab of a Web browser interface, and so forth. The video data for the frame can be changed and provided to paint controller module 210 by user input module 212, or alternatively the video data for the frame can be changed by another component or module of system 200.

A variety of different events or signals can be used by paint beat module 208 to determine when to trigger or activate animation timer 206 and paint controller module 210. In one or more embodiments, paint beat module 208 determines to trigger or activate animation timer 206 (and then paint controller module 210) in response to a vertical blank (vblank) interrupt or signal received from vertical blank provider module 214. Vertical blank provider module 214 can be a, or included as part of a, display adapter (such as a graphics card) that can be, for example, display adapter 108 of FIG. 1. The vblank interrupt or signal is provided by vertical blank provider module 214 to indicate that the display adapter is about ready to encode and send another frame of data to the display screen.

Typically, paint beat module 208 triggers or otherwise activates animation timer 206 prior to triggering or otherwise activating paint controller module 210. After animation routine 204 has completed updating the state of the animation, paint beat module 208 triggers or otherwise activates paint controller module 210. Alternatively, paint beat module 208 can trigger or otherwise activate paint controller module 210 before animation routing is triggered or otherwise activated, or prior to animation routine 204 completing updating the state of the animation.

It should be noted that, although animation routine 204 may notify browser engine 202 of how regularly animation routine 204 desires to be awakened or otherwise activated, animation routine 204 is awakened or otherwise activated by paint beat module 208. Paint beat module 208 determines when to trigger or activate animation timer 206 based on a variety of different events or signals and does not simply activate animation routine 204 at the times when animation routine 204 has indicated it desires to be awakened or otherwise activated.

Alternatively, animation timer 206 can indicate to paint beat module 208 the frequency at which animation timer 206 desires to be activated. For example, animation timer 206 may indicate to paint beat module 208 that it is to be triggered every 15 milliseconds (ms), or alternatively every 33.33 ms, etc. Paint beat module 208 maintains a record of animation timer 206 and when animation timer 206 is next due to be activated (and updates, each time animation timer 206 is activated, when animation timer 206 is next due to be activated). Animation timer 206 is then activated by paint beat module 208 based on both a particular event or signal (e.g., receiving of a vblank interrupt or signal) and when animation timer 206 is next due to be activated. For example, paint beat module 208 can determine it is time to activate animation timer 206 in response to both receiving a particular event or signal (e.g., a vblank interrupt or signal) and determining (based on the record maintained by paint beat module 208) that the time for which animation timer 206 is next due to be activated has passed.

Thus, the updating of the frame as a result of the animation by animation routine 204 and the composing of a new frame of video data by paint controller module 210 are aligned by paint beat module 208. Both the updating of the state and the composing of the new frame for display are triggered by paint beat module 208 and are triggered by the same event or signal. Thus, rather than triggering the updating of the state and the composing of the new frame at different frequencies or based on different timers, the updating of the state and the composing of the new frame are aligned to the same event or signal. This aligning reduces the jittery or jumping appearance of animations because it prevents situations from arising where the updating of the state is performed a different number of times for each new frame being composed. For example, if new frames were being composed every 16.67 ms, and the state of the animation were being updated every 15 ms, sometimes the state of the animation would be updated once prior to the next frame being composed and sometimes the state of the animation would be updated twice prior to the next frame being composed. Aligning the updating of the state and the composing of the new frame to the same event or signal prevents such situations from occurring.

Furthermore, by triggering both the updating of the state and the new frame being generated for display based on the vblank interrupt or signal, both the updating of the state and the composing of the new frame are performed just prior to the display adapter encoding and sending another frame to the display screen. Thus, rather than triggering the updating of the state and composing of the new frame based on a system timer operating at a different frequency than the display adapter is encoding and sending frames to the display screen, the updating of the state and the composing of the new frame are performed based on (e.g., at the same frequency as) the frequency at which the display adapter is encoding and sending frames to the display screen.

Thus, the frames displayed to the user have consistent updates in them, reducing the jittery or jumping appearance of animations as displayed to the user. The more such updates can be aligned in the pipeline or stack from updating of the animations to actual display by the user, the more consistent the display of the updates is to the user. For example, a jittery or jumping appearance of animations can be further reduced by ensuring that the display adapter (such as a graphics card) is aligned or synchronized with the display screen. If the display screen is updating at one frequency, then the display adapter is aligned or synchronized with the display screen if the display adapter is sending to the display screen at the same frequency (or at a frequency that is (an integer) factor of, and less than, the frequency) at which the display screen is updating is display of the frames.

Alternatively, other events or signals can be used by paint beat module 208 to determine when to trigger or activate animation timer 206. Paint beat module 208 can be configured to use such other events or signals regularly, or alternatively in response to particular situations such as if the vblank interrupt or signal is not available. The vblank interrupt or signal may not be available for a variety of different reasons, such as the display screen being in a power saving mode or having been turned off.

In one or more embodiments, watchdog module 216 determines when the vblank interrupt or signal is not being received from vertical blank provider module 214, and thus that paint beat module 208 is to use a different event or signal to determine when to trigger or activate animation timer 206 and paint controller module 210. One such different event or signal is a system timer signal provided by system timer module 218. Paint beat module 208 can request to receive a system timer signal from system timer module 218 at particular intervals (e.g., every 10 ms, every 15 ms, etc.). In response to such request, system timer module 218 provides the system timer signal to paint beat module 208, which responds to the system timer signal analogous to the vblank interrupt or signal discussed above.

Watchdog module 216 can determine when the vblank interrupt or signal is not being received from vertical blank provider module 214 in a variety of different manners. In one or more embodiments, watchdog module 216 receives a notification from vertical blank provider module 214 of the particular frequency at which vertical blank provider module 214 will be providing the vblank interrupt or signal. Watchdog module 216 receives the vblank interrupt or signal, and notifies paint beat module 208 if the vblank interrupt or signal is not being provided at that particular frequency. In other embodiments, watchdog module 216 monitors the vblank interrupt or signal provided by vertical blank provider module 214 and determines the particular frequency at which vertical blank provider module 214 is providing the vblank interrupt or signal (without having been explicitly notified of that frequency by vertical blank provider module 214). Watchdog module 216 then notifies paint beat module 208 if the vblank interrupt or signal is not being provided at that particular frequency.

At different times during operation, paint beat module 208 can use different ones of multiple different events or signals to determine when to trigger or activate animation timer 206. For example, paint beat module 208 can use the vblank interrupt or signal, a system timer signal provided by system timer module 218 in response to watchdog module 216 determining that the vblank interrupt or signal is not being received from vertical blank provider module 214, and an indication of user input received from user input module 212 or other received indications of changes to the video data for the frame.

Thus, it can be seen that both the updating of regions of the frame as a result of the animation by animation routine 204 and the composing of a new frame of data by paint controller module 210 are initiated or activated by paint beat module 208. The updating of the regions of the frame and composing of the new frame can be initiated or activated by paint beat module 208 based on various different events or signals. The new video frame, including updates for the invalidated regions, is composed in response to paint controller module 210 being activated by paint beat module 208, not in response to other events or signals in system 200.

In one or more embodiments, paint beat module 208 activates animation timer 206 and paint controller module 210 in response to each event or signal it receives (e.g., each vblank interrupt or signal). Thus, for example, if the display adapter is encoding and sending frames to the display screen at a rate of 60 frames per second, then paint beat module 208 receives vblank interrupts or signals at a rate of 60 times per second, and activates animation timer 206 and paint controller module 210 at a rate of 60 times per second.

In other embodiments, paint beat module 208 activates animation timer 206 and/or paint controller module 210 at a rate that is (an integer) factor of, and less than, the rate at which paint beat module 208 receives the events or signals. Thus, for example, if the display adapter is encoding and sending frames to the display screen at a rate of 60 frames per second, then paint beat module 208 receives vblank interrupts or signals at a rate of 60 times per second, and can activate animation timer 206 and/or paint controller module 210 at a rate of 30 times per second (or 20 times per second, or 15 times per second, etc.).

Paint beat module 208 can be configured to activate animation timer 206 and/or paint controller module 210 at a particular rate that is a factor of the rate at which paint beat module 208 receives the events or signals. In one or more embodiments, paint beat module 208 is configured to activate animation timer 206 and paint controller module 210 every 10 ms to 20 ms. Based on the rate at which paint beat module 208 receives the events or signals, paint beat module 208 determines a particular rate that is both a factor of the rate at which paint beat module 208 receives the events or signals and that is between 10 ms and 20 ms. If multiple such rates exist, then one of such multiple rates can be selected (e.g., selecting randomly, selecting the highest rate, selecting the rate closest to 15 ms, etc.). For example, if paint beat module 208 receives the events or signals at a rate of 240 frames per second (equating to every 4.17 ms), then paint beat module 208 can select 60 times per second as the rate at which animation timer 206 and paint controller module 210 are activated (equating to activating animation timer 206 and paint controller module 210 every 16.67 ms).

Alternatively, paint beat module 208 can dynamically adjust the rate at which animation timer 206 and/or paint controller module 210 are activated. In one or more embodiments, after activating animation timer 206 paint beat module 208 receives an indication (e.g., from animation timer 206 or animation routine 204) that the updating of the state of an animation by animation routine 204 has been completed. Paint beat module 208 can monitor the amount of time taken by animation routine 204 to update the state of the animation and readily determine whether there is sufficient time for animation routine 204 to update the state of the animation if paint beat module 208 continues to activate animation timer 206 and paint controller module 210 at the current rate. If there is insufficient time for animation routine 204 to update the state of the animation if paint beat module 208 continues to activate animation timer 206 and paint controller module 210 at the current rate, then paint beat module 208 can reduce the rate at which animation timer 206 and paint controller module 210 are activated.

For example, assume paint beat module 208 activates animation timer 206 at a rate of 60 times per second, which equates to activating animation timer 206 every 16.67 ms. Further assume that animation routine 204 takes 20 ms to update the state of the animation. Paint beat module 208 can thus readily determine that animation routine 204 takes too long to update the state of the animation to continue activating animation timer 206 every 16.67 ms. Accordingly, paint beat module 208 reduces the rate at which animation timer 206 is activated to a factor of 60 that provides sufficient time for animation routine 204 to update the state of the animation. For example, paint beat module 208 can reduce the rate at which animation timer 206 is activated to 30 times per second, which equates to activating animation timer 206 every 33.33 ms.

Paint beat module 208 can optionally continue to monitor the amount of time taken by animation routine 204 to update the state of the animation and increase or decrease the rate at which animation timer 206 is activated based on this monitoring. For example, continuing with the previous example, if animation routine 204 were to subsequently take 40 ms to update the state of the animation, then paint beat module 208 can again reduce the rate at which animation timer 206 is activated (e.g., to 20 times per second, which equates to activating animation timer 206 every 50 ms). By way of another example, if animation routine 204 were to subsequently take 12 ms to update the state of the animation, then paint beat module 208 can increase the rate at which animation timer 206 is activated (e.g., returning to 60 times per second).

In situations where paint beat module 208 reduces the rate at which animation timer 206 is activated, paint beat module 208 also reduces to the same rate the rate at which paint controller module 210 is activated. Accordingly, if animation timer 206 is activated 30 times per second, then paint controller module 210 is also activated 30 times per second. This can result in situations where the display adapter encodes and provides frames for display to the display screen at a greater rate (e.g., 60 times per second) than paint controller module 210 generates the frames (e.g., 30 times per second).

Additionally, in one or more embodiments paint beat module 208 can be configured to activate paint controller module 210 at a particular rate that is a factor of the rate at which paint beat module 208 receives the events or signals, or alternatively can dynamically adjust the rate at which paint controller module 210 is activated. Similar to the discussion above regarding paint beat module 208 monitoring the amount of time taken for animation routine 204 to update the state of the animation, paint beat module 208 can monitor the amount of time taken for paint controller module 210 to compose the new frame of video data for display. For example, after paint controller module 210 composes a frame, beat module 208 receives an indication (e.g., from paint controller module 210) that the new frame of video data has been composed. Paint beat module 208 can monitor the amount of time taken by paint controller module 210 to compose the new frame of data and readily determine whether there is sufficient time for paint controller module 210 to compose new frames of data if paint beat module 208 continues to paint controller module 210 at the current rate. There may be an insufficient amount of time for paint controller 210 to compose the new frame of data at the current rate for a variety of different reasons, such as paint controller module 210 running on a graphics processing unit (GPU) that is slower than a central processing unit (CPU) on which paint beat module 208 and animation routine 204 are running.

If there is insufficient time for paint controller module 210 to compose new frames of data if paint beat module 208 continues to activate paint controller module 210 at the current rate, then paint beat module 208 can reduce the rate at which paint controller module 210 is activated. Paint beat module 208 can continue to monitor the amount of time taken by paint controller module 210 to compose new frames of data, and increase or decrease the rate at which paint controller module 210 is activated accordingly.

In situations where paint beat module 208 reduces the rate at which paint controller module 210 is activated, paint beat module 208 need not reduce the rate at which animation timer 206 is activated. Accordingly, if paint controller module 210 is reduced to being activated 30 times per second, then animation timer 206 can continue to be activated 60 times per second. Alternatively, paint controller module 210 can be reduced to the same rate as the rate at which paint beat module 208 is activated.

Additionally, situations can arise in which animation routine 204 takes longer than expected to update the state of the animation, such as due to animation routine 204 becoming hung. In one or more embodiments, in such situations subsequent vblank interrupts or signals received from vertical blank provider module 214 are not recorded or queued until animation routine 204 has completed updating the state of the animation. Paint beat module 208 maintains a record of the most recently received vblank interrupt or signal for which it activated animation timer 206. If any additional vblank interrupts or signals are received by paint beat module 208 before paint beat module 208 receives an indication that animation routine 204 has completed updating the state of the animation, then such additional vblank interrupts or signals are ignored (e.g., not queued) until paint beat module 208 receives an indication that animation routine 204 has completed updating the state of the animation.

A single animation routine 204 and animation timer 206 are illustrated in system 200. However, it should be noted that multiple animation routines 204 can be run in browser engine 202, and that each of the multiple animation routines 204 can have one or more associated animation timers 206. Each of these animation timers 206 can be triggered at the same frequency (e.g., triggered by paint beat module 208 in response to each vblank interrupt or signal), or alternatively at different frequencies. For example, one animation timer 206 may indicate to paint beat module 208 that it is to be triggered every 15 ms, while another animation timer 206 may indicate to paint beat module 208 that it is to be triggered every 33.33 ms.

Additionally, although a single paint beat module 208, animation timer 206, paint controller module 210, browser engine 202, and user input module 212 are illustrated in FIG. 2, alternatively system 200 can include any number of paint beat modules 208, animation timers 206, paint controller modules 210, browser engines 202, and/or user input module 212. In such situations, multiple different paint beat modules 208 can be included in system 200, each receiving the same vblank interrupt or signal from vertical blank provider module 214, although alternatively each paint beat module can receive a vblank interrupt or signal from different vertical blank provider modules 214. Similarly, multiple watchdog modules 216 can be included in system 200, each watchdog module 216 determining when the vblank interrupt or signal is not being received from vertical blank provider module 214 and notifying a paint beat module 208 associated with that watchdog module 216 to use a different event or signal to determine when to trigger or activate an associated animation timer 206 and associated paint controller module 210.

For example, multiple different browser engines 202 can be included in system 200, such as multiple instances of the same Web browser (e.g., opened in different tabs of a Web browser interface). Each different browser engine 202 has an associated paint beat module 208, paint controller module 210, animation routine 204, and animation timer 206. Each different browser engine 202 can also have an associated user input module 212, or alternatively multiple browser engines 202 can receive user inputs from the same user input module 212. Each different paint beat module 208 receives the same vblank interrupt or signal from vertical blank provider module 214, although each different paint beat module 208 can activate its associated animation timer 206 and/or paint controller module 210 at different frequencies (determined as discussed above).

Additionally, in one or more embodiments paint beat module 208 responds to user inputs received from user input module 212. Paint beat module 208 can activate one or more additional routines (not shown) to process user inputs, which can result in invalidating regions of the frame (e.g., due to data entered, due to movement of a cursor, due to a tooltip or other information to be displayed based on the location of a cursor, and so forth). However, situations can arise where these additional routines cannot be run concurrently with animation routine 204. Thus, if the amount of time taken by animation routine 204 to update the state of the animation is large enough that there is very little (or no time) between the animation routine 204 finishing updating the state of the animation in response to being activated and needing to update the state of the animation again in response to being activated again, very little or no time can remain for these one or more additional routines to be activated to process user inputs.

In one or more embodiments, this situation is resolved by paint beat module 208 treating routines that process user inputs as a higher priority than animation routine 204. If a user input has been received from user input module 212, then paint beat module activates one or more of the routines to process the user inputs prior to activating animation routine 204. Thus, even if animation routine 204 is to be activated, a routine to process the user inputs is activated if any user inputs have been received from user input module 212 but not yet processed. However, to ensure that animation routine 204 is not starved off, if animation routine 204 has not been activated for a threshold amount of time (e.g., 200 ms), then animation routine 204 is activated prior to a routine to process the user inputs is activated even if user inputs have been received from user input module 212 but not yet processed.

The aligning of updating of the frame as a result of the animation by animation routine 204 and the composing of a new frame of data by paint controller module 210 provides a smooth, jitter-free display of the animation. However, receiving the vblank interrupt or signal can be a power-consuming process, and paint beat module 208 can determine to not use the vblank interrupt or signal at particular times in order to conserve power in the device implementing system 200. Paint beat module 208 can notify vertical blank provider module 214 that the vblank interrupt or signal is not desired, or alternatively is only desired at particular intervals (e.g., every second rather than 60 times per second). In response to such a notification, vertical blank provider module 214 ceases providing the vblank interrupt or signal, or provides the vblank interrupt or signal only at the desired intervals. Thus, the CPU or other processor of system 200 that manages the vblank interrupt or signal need not be woken up or need not be woken up as frequently (e.g., once per second rather than 60 times per second), and thus can conserve power. To conserve power, paint beat module 208 can optionally use another event or signal rather than the vblank interrupt or signal, such as a system timer signal received from system timer module 218. Alternatively, to conserve power paint beat module 208 can use no other event or signal (e.g., if there is no updating of state to be performed by animation routine 204).

In one or more embodiments, paint beat module 208 determines to not use the vblank interrupt or signal in situations where the animation being updated by animation routine 204 is not displayed. Such situations can arise, for example, when a window in which the user interface for browser engine 202 is displayed is minimized or hidden by another window.

Whether a window in which the user interface for browser engine 202 is displayed is minimized or hidden by another window can be identified in different manners, such as paint beat module 208 being notified that the window is minimized or hidden by an operating system running on system 200.

Additionally, paint beat module 208 can determine to not use the vblank interrupt or signal in situations in which paint controller module 210 composes a new frame of video data for display at less than a threshold frequency (e.g., less than 5 times per second). Furthermore, paint beat module 208 can determine to not use the vblank interrupt or signal in situations in which the display screen is powered down or in a power saving mode. Paint beat module 208 can be notified of such situations by, for example, an operating system running on system 200 or a display adapter (e.g., that is or includes vertical blank provider module 214).

Additionally, in one or more embodiments system 200 operates based on a granular system clock that has a granularity that is at least as small as the frequency of requests for the current system time, so that when the system clock is queried the system clock returns a time that is at least as granular as the frequency of requests. For example, if animation routine 204 were to query the system clock every 2 ms for the current time, the system clock provides at least 2 ms of granularity. Thus, each query to the system clock for the current time by animation routine 204 would result in a different current time being returned to animation routine 204. If the system clock were to provide less granularity (e.g., 5 ms of granularity), then two queries by animation routine 204 for the current time that are made 2 ms apart could result in the same time current time being returned to animation routine 204 for each such query.

Figure 3:
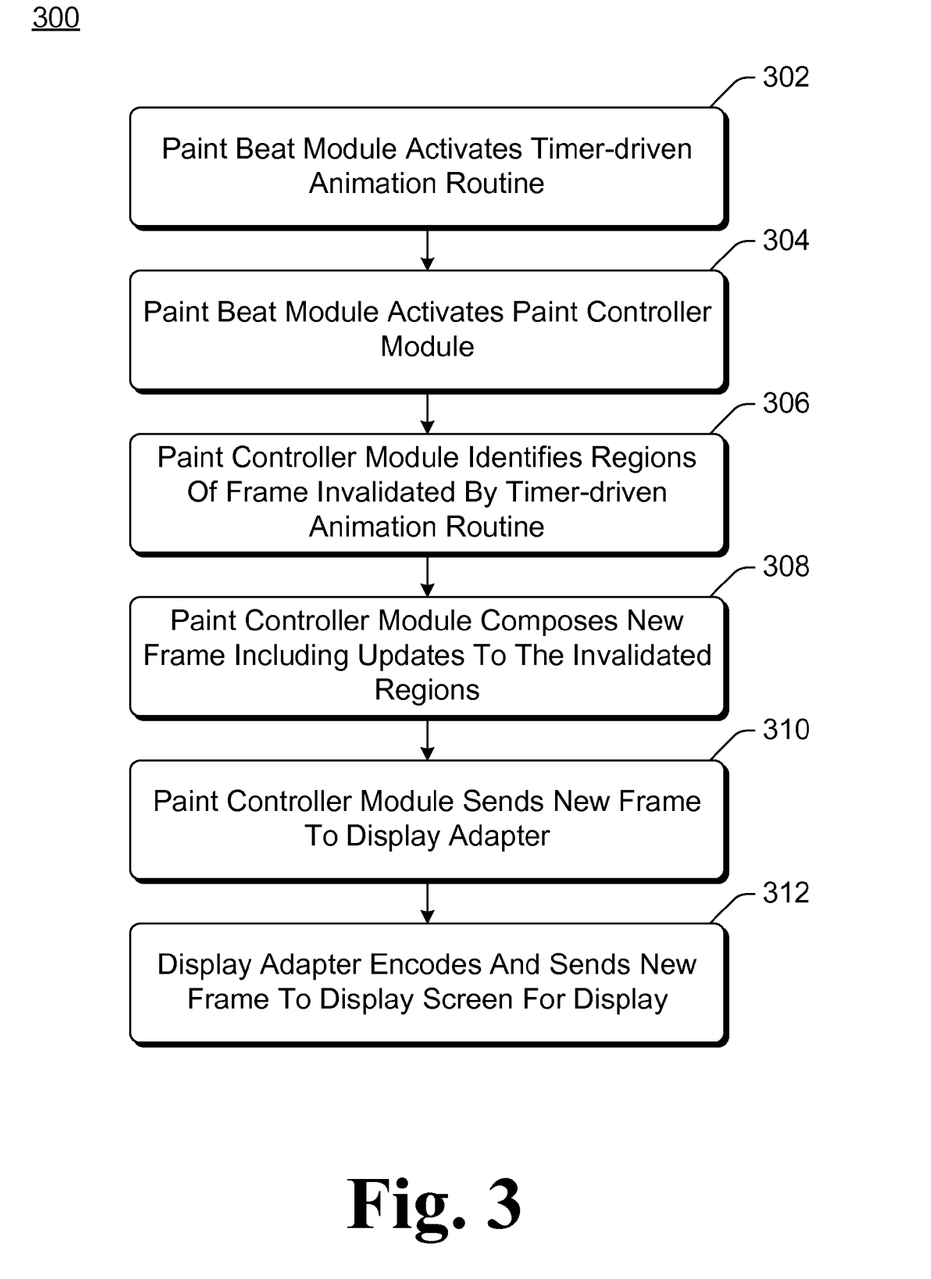
FIG. 3 is a flowchart illustrating an example process displaying timer-driven animations in accordance with one or more embodiments.

FIG. 3 is a flowchart illustrating an example process 300 displaying timer-driven animations in accordance with one or more embodiments. Process 300 is carried out by a system, such as system 100 of FIG. 1 or system 200 of FIG. 2, and can be implemented in software, firmware, hardware, or combinations thereof. Process 300 is shown as a set of acts and is not limited to the order shown for performing the operations of the various acts. Process 300 is an example process for displaying timer-driven animations; additional discussions of displaying timer-driven animations are included herein with reference to different figures.

In process 300, a paint beat module activates a timer-driven animation routine (act 302), which updates a state of the animation. This activation of the timer-driven animation routine can be performed by triggering or otherwise activating an animation timer as discussed above. The paint beat module can activate the timer-driven animation routine based on a vertical blank interrupt or signal, or alternatively another event or signal as discussed above.

The paint beat module also activates a paint controller module (act 304). The paint beat module activates the paint controller module based on the same interrupt, signal, or other event as activation of the timer-driven animation routine is based as discussed above.

The paint controller module identifies one or more regions of a frame of video data to be displayed that are invalidated by the timer-driven animation routine (act 306). The paint controller module can also identify regions of the frame of video data that are invalidated by other routines or modules, such as user inputs received from a user input module.

The paint controller module composes a new frame that includes the updates to the invalidated regions (act 308). These updates in act 308 are the updates resulting from the change in state of the animation by the timer-driven animation routine, as well as any changes resulting from other routines or modules (e.g., from user inputs).

The paint controller module sends the newly generated frame to the display adapter (act 310). The display adapter encodes the newly generated frame into a format expected by the display screen, and sends the encoded frame to the display screen for display (act 312).

Figure 4:
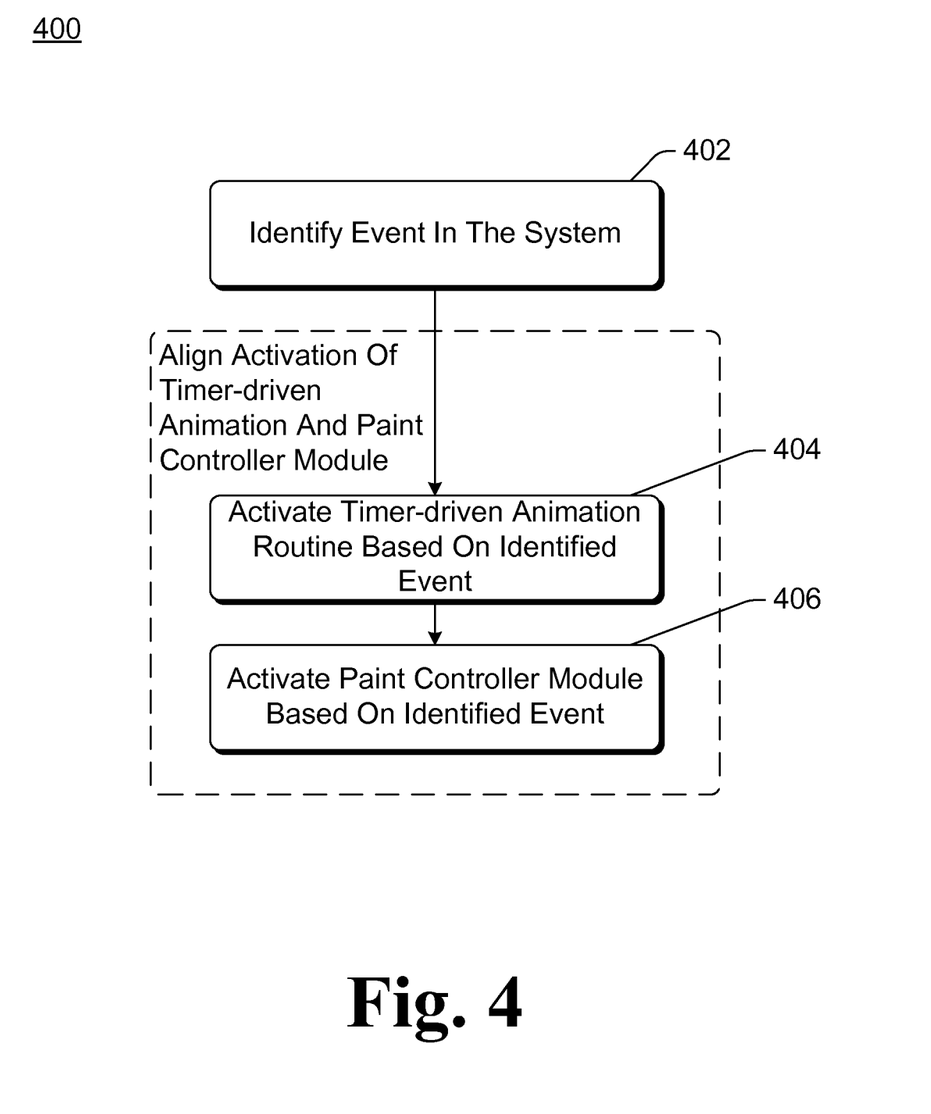
FIG. 4 is a flowchart illustrating an example process for aligning animation state update and frame composition in accordance with one or more embodiments.

FIG. 4 is a flowchart illustrating an example process 400 for aligning animation state update and frame composition in accordance with one or more embodiments. Process 400 is carried out by a system, such as system 100 of FIG. 1 or system 200 of FIG. 2, and can be implemented in software, firmware, hardware, or combinations thereof. Process 400 is shown as a set of acts and is not limited to the order shown for performing the operations of the various acts. Process 400 is an example process for aligning animation state update and frame composition; additional discussions of aligning animation state update and frame composition are included herein with reference to different figures.

In process 400, an event in the system is identified (act 402). The event can be a vertical blank interrupt or signal, or alternatively another event or signal as discussed above.

A timer-driven animation routine is activated based on the identified event (act 404), and a paint controller module is also activated based on the identified event (act 406). By activating both the timer-driven animation routine and the paint controller module based on the same identified event, the activation of the timer-driven animation routine and the paint controller module are aligned with one another.

Figure 5:
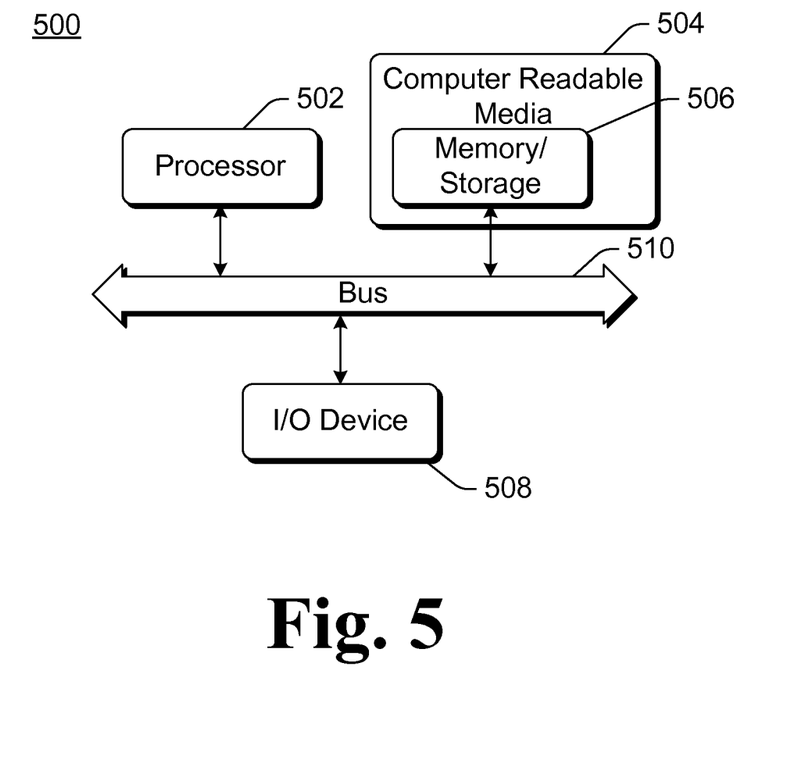
FIG. 5 illustrates an example computing device that can be configured to implement the aligning animation state update and frame composition in accordance with one or more embodiments.

FIG. 5 illustrates an example computing device 500 that can be configured to implement the aligning animation state update and frame composition in accordance with one or more embodiments. Computing device 500 can implement, for example, at least part of system 100 of FIG. 1 or at least part of system 200 of FIG. 2.

Computing device 500 includes one or more processors or processing units 502, one or more computer readable media 504 which can include one or more memory and/or storage components 506, one or more input/output (I/O) devices 508, and a bus 510 that allows the various components and devices to communicate with one another. Computer readable media 504 and/or one or more I/O devices 508 can be included as part of, or alternatively may be coupled to, computing device 500. Bus 510 represents one or more of several types of bus structures, including a memory bus or memory controller, a peripheral bus, an accelerated graphics port, a processor or local bus, and so forth using a variety of different bus architectures. Bus 510 can include wired and/or wireless buses.

Memory/storage component 506 represents one or more computer storage media. Component 506 can include volatile media (such as random access memory (RAM)) and/or non-volatile media (such as read only memory (ROM), Flash memory, optical disks, magnetic disks, and so forth). Component 506 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 502. It is to be appreciated that different instructions can be stored in different components of computing device 500, such as in a processing unit 502, in various cache memories of a processing unit 502, in other cache memories of device 500 (not shown), on other computer readable media, and so forth. Additionally, it is to be appreciated that the location where instructions are stored in computing device 500 can change over time.

One or more input/output devices 508 allow a user to enter commands and information to computing device 500, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 5. The features of the aligning animation state update and frame composition techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method in a system, the method comprising:
   identifying an event in the system;
   determining a first amount of time for a timer-driven animation routine to update a state of an animation by updating the display of one or more regions of a frame;
   monitoring a second amount of time taken by a paint controller module to identify updates to the state of the animation and to compose a frame that includes the updates to the state of the animation; and
   adjusting, in response to the identified event, a rate at which both the timer-driven animation routine is activated and the paint controller module is activated based at least in part on the first amount of time and the second amount of time,
   such that the rate is sufficient for the timer-driven animation routine to update the state of the animation for subsequent frames and the rate is sufficient for the paint controller module to compose each of the subsequent frames.

2. A method as recited in claim 1, the adjusting the rate comprising reducing, in response to there being insufficient time for the timer-driven animation routine to update the state of the animation at the current rate, the rate at which both the timer-driven animation routine is activated and the paint controller module is activated.

3. A method as recited in claim 2, the adjusting the rate further comprising increasing, after reducing the rate at which both the timer-driven animation routine is activated and the paint controller module is activated, the rate.

4. A method as recited in claim 1, further comprising activating one or more additional routines to process user inputs by:
   determining whether the timer-driven animation routine has not been activated for a threshold amount of time; and
   if the timer-driven animation routine has not been activated for the threshold amount of time, then activating the timer-driven animation routine prior to activating the one or more additional routines to process the user inputs, otherwise activating the one or more additional routines to process the user inputs prior to activating the timer-driven animation routine.

5. A method as recited in claim 1, further comprising conserving power in the system by determining to use as the event a system timer signal rather than a vertical blank interrupt if the paint controller module composes frames at less than a threshold frequency, and otherwise determining to use as the event the vertical blank interrupt rather than the system timer signal.

6. A method as recited in claim 1, the identifying comprising identifying, as the event, a vertical blank interrupt received from a display adapter in the system.

7. A method as recited in claim 6, the identifying further comprising identifying, as the event, a system timer signal in response to the vertical blank interrupt not being received from the display adapter.

8. A method as recited in claim 1, further comprising the paint controller module generating new video data for the one or more regions when composing the frame.

9. A method as recited in claim 1, the timer-driven animation routine comprising a script in a web page being run in a browser engine of the system.

10. A method as recited in claim 1, the adjusting comprising activating the timer-driven animation routine and the paint controller module at a frequency that is an integer factor of and less than a rate at which the event is identified.

11. A method in a system, the method comprising:
    identifying an event in the system, the event comprising a vertical blank interrupt received from a display adapter in the system or a system timer signal;
    determining a first amount of time for a timer-driven animation routine to update a state of an animation;
    monitoring a second amount of time taken by a paint controller module to identify updates to the state of the animation and to compose a frame that includes the updates to the state of the animation;
    adjusting, in response to the identified event, a rate at which the timer-driven animation routine is activated and the paint controller module is activated based at least in part on the first amount of time and the second amount of time, such that the-rate is sufficient for the timer-driven animation routine to update the state of the animation for subsequent frames and the rate is sufficient for the paint controller module to compose each of the subsequent frames; and conserving power in the system by determining to use as the event the system timer signal rather than the vertical blank interrupt if the paint controller module composes frames at less than a threshold frequency, and otherwise determining to use as the event the vertical blank interrupt rather than the system timer signal.

12. A method as recited in claim 11, the conserving power further comprising conserving power in the system by determining to not use the vertical blank interrupt if a window in which the animation is displayed is hidden or minimized.

13. A method as recited in claim 11, further comprising activating one or more additional routines to process user inputs by:
determining whether the timer-driven animation routine has not been activated for a threshold amount of time; and
if the timer-driven animation routine has not been activated for the threshold amount of time, then activating the timer-driven animation routine prior to activating the one or more additional routines to process the user inputs, otherwise activating the one or more additional routines to process the user inputs prior to activating the timer-driven animation routine.

14. A method as recited in claim 11, wherein the timer-driven animation routine updates one or more regions of the frame, and the paint controller module generates new video data for the one or more regions when composing the frame.

15. A method as recited in claim 14, wherein the timer-driven animation routine comprises a script in a web page being run in a browser engine of the system.

16. A method as recited in claim 11, wherein the adjusting comprises activating the timer-driven animation routine and the paint controller module at a frequency that is an integer factor of and less than a rate at which the event is identified.

17. A method in a system, the method comprising:
identifying an event in the system;
determining a first amount of time for a timer-driven animation routine to update a state of an animation;
monitoring a second amount of time taken by a paint controller module to identify updates to the state of the animation and to compose a frame that includes the updates to the state of the animation;
adjusting, in response to the identified event, a rate at which the timer-driven animation routine is activated and the paint controller module is activated based at least in part on the first amount of time and the second amount of time,
such that the rate is sufficient for the timer-driven animation routine to finish updating the state of the animation for subsequent frames and the rate is sufficient for the paint controller module to compose each of the subsequent frames; and
activating one or more additional routines to process user inputs by:
determining whether the timer-driven animation routine has not been activated for a threshold amount of time; and
if the timer-driven animation routine has not been activated for the threshold amount of time, then activating the timer-driven animation routine prior to activating the one or more additional routines to process the user inputs, otherwise activating the one or more additional routines to process the user inputs prior to activating the timer-driven animation routine.

18. A method as recited in claim 17, the identifying comprising identifying, as the event, a system timer signal in response to a vertical blank interrupt not being received from a display adapter in the system.

19. A method as recited in claim 17, wherein the timer-driven animation routine comprises a script in a web page being run in a browser engine of the system.

20. A method as recited in claim 17, wherein the aligning comprises activating the timer-driven animation routine and the paint controller module at a frequency that is an integer factor of and less than a rate at which the event is identified.

* * * * *